United States Patent [19]
Parekh et al.

[11] Patent Number: 5,642,654
[45] Date of Patent: Jul. 1, 1997

[54] PISTON AND METHOD OF MANUFACTURING THE SAME

[75] Inventors: Mahendra B. Parekh; Leon Kitzmiller, both of Rockford; Richard C. Costello, Kirkland; C. Allen Grow, Rockford; Gordon Pinchott, Rockford; Dennis O'Leary, Rockford; Louis M. MacDougall, Rockford; David W. Okey, Rockford; Edward J. Fowler, Rockford, all of Ill.

[73] Assignee: Sundstrand Corporation, Rockford, Ill.

[21] Appl. No.: 299,726

[22] Filed: Sep. 1, 1994

[51] Int. Cl.$^6$ .................................................. F16J 1/00
[52] U.S. Cl. .............................. 92/260; 92/172; 92/187
[58] Field of Search ........................... 92/172, 176, 222, 92/231, 260; 123/193.6

[56] References Cited

U.S. PATENT DOCUMENTS

| | | | |
|---|---|---|---|
| 1,700,604 | 1/1929 | Wagener | 92/231 |
| 2,198,771 | 4/1940 | Hazen et al. | 123/176 |
| 2,244,008 | 6/1941 | Hazen et al. | 309/14 |
| 2,361,046 | 10/1944 | Molly | 148/12 |
| 2,752,213 | 6/1956 | Swart et al. | 92/260 |
| 3,319,536 | 5/1967 | Kohl et al. | 92/231 |
| 3,319,575 | 5/1967 | Havens | 103/162 |
| 3,354,793 | 11/1967 | Meier | 92/231 |
| 3,596,571 | 8/1971 | Hill et al. | 92/231 |
| 3,613,521 | 10/1971 | Itano | 92/231 |
| 3,707,113 | 12/1972 | Hein et al. | 92/172 |
| 4,552,057 | 11/1985 | Mizuhara | 92/260 |
| 4,651,631 | 3/1987 | Avezou | 92/224 |
| 5,007,332 | 4/1991 | Wagenseil | 92/181 |
| 5,076,148 | 12/1991 | Adler | 92/158 |
| 5,216,943 | 6/1993 | Adler et al. | 92/157 |
| 5,265,331 | 11/1993 | Engel et al. | 92/157 |
| 5,309,818 | 5/1994 | Mendes et al. | 92/176 |

FOREIGN PATENT DOCUMENTS

| | | | |
|---|---|---|---|
| 3304903 | 8/1984 | Germany | 92/260 |

*Primary Examiner*—Thomas E. Denion
*Attorney, Agent, or Firm*—Kristin L. Chapman

[57] ABSTRACT

This invention relates to a piston and a method of manufacturing the same. The piston includes a substantially cylindrical member having a first end and a second end. The cylindrical member includes an open cavity extending axially from the second end to adjacent the first end such that the second end has an inner annular surface defined by an inner diameter. The piston further includes a disk having a radially outer surface defined by an outer diameter fixedly secured to the second end of the cylindrical member. The outer diameter of the disk is substantially equal to the inner diameter of the inner annular surface of the second end of the cylindrical member. A circumferentially extending recessed area for receiving particles produced while fixedly securing the disk to the second end of the cylindrical member is provided on either the radially outer surface of the disk or the inner annular surface of the second end of the cylindrical member.

26 Claims, 7 Drawing Sheets

PISTON AND METHOD OF MANUFACTURING THE SAME

FIELD OF THE INVENTION

This invention relates to a piston and a method for manufacturing the same.

BACKGROUND ART

Pistons which are adapted for use in hydraulic pumps and motors are subject to significant stress levels and high velocities, as the pistons translate and rotate within a cylinder block. In order to withstand such a harsh operating environment, they should be constructed from a strong wear resistant material, but simultaneously not hinder performance with excess weight. Therefore, a hollowed section may be provided in the piston, as disclosed by Havens in U.S. Pat. No. 3,319,575, for example.

However, often in the construction of pistons with hollowed sections, excess particles from the process of joining the various segments together may settle within the hollowed section. This poses a significant problem as the undesirable particles wear on the inner walls of the piston during operation within the cylinder block, and subsequently contaminate the piston structure. Continual translational and rotational motion may trigger failure of one of the pistons, and eventually cause malfunctioning of the hydraulic unit.

The problems of weld particles within a piston chamber used in internal combustion engines is recognized in a patent to Kohl et al., U.S. Pat. No. 3,319,536. Kohl et al. discloses the use of annular rings spaced from the piston chamber into which the ends of charged particle beams extend, so that if the welded seams created from the charged particle beams tear, the tear will follow the contour of the rings. While Kohl et al. seeks to overcome the problem of excess weld particles by providing a extrinsic element, it does not, as the invention to be described more fully hereinafter, teach providing a circumferentially extending recessed area within the piston structure to receive and contain particles produced while constructing the piston.

The present invention is directed to overcoming the above-referenced problems.

SUMMARY OF THE INVENTION

More specifically, this invention relates to a piston and a method of manufacturing the same. The piston includes a substantially cylindrical member having a first end and a second end. The cylindrical member includes an open cavity extending axially from the second end to adjacent the first end such that the second end has an inner annular surface defined by an inner diameter. The piston further includes a disk having a radially outer surface defined by an outer diameter fixedly secured to the second end of the cylindrical member. The outer diameter of the disk is substantially equal to the inner diameter of the inner annular surface of the second end of the cylindrical member. The radially outer surface of the disk includes a circumferentially extending recessed area for receiving particles produced while fixedly securing the disk to the second end of the cylindrical member.

It is therefore a primary object of the invention to provide a piston and a method of manufacturing the same which prevents particles from entering a cavity of a cylindrical member while fixedly securing a disk to a second end of the cylindrical member.

It is a further object of the invention to provide a piston and a method of manufacturing the same which receives and contains particles produced from fixedly securing an annular cylindrical member to an elongated member within first and second circumferentially extending recessed areas.

A feature of one embodiment of the invention is to provide the cavity extending from the second end of the cylindrical member as annularly shaped such that the second end has an inner elongated portion which has a radially outer surface defined by an outer diameter which is concentrically located within the inner annular surface, and to provide the disk in the form of an annular ring having a central opening therethrough. The annular ring includes a radially inner surface defined by an inner diameter about the opening which is substantially equal to the outer diameter of the inner elongated portion of the second end of the cylindrical member.

A further feature of the embodiment of the invention is to provide a circumferentially extending recessed area for receiving particles produced while fixedly securing the annular ring to the second end of the cylindrical member on either the radially outer surface and the radially inner surface of the annular ring, or on the inner annular surface and the radially outer surface of the inner elongated portion of the second end of the cylindrical member.

Another feature of the invention is to provide the cylindrical member as an integral element.

Yet another feature of one embodiment of the invention is to provide a method of manufacturing a piston which includes providing a substantially cylindrical member having a first end and a second end and forming an open cavity in the cylindrical member extending axially from the second end to adjacent the first end such that the second end has an inner annular surface defined by an inner diameter. The method also includes providing a disk having a radially outer surface defined by an outer diameter substantially equal to the inner diameter of the inner annular surface of the second end of the cylindrical member. The method further includes forming a circumferentially extending recessed area either in the radially outer surface of the disk or in the inner annular surface of the second end of the cylindrical member, and welding or brazing the disk to the second end of the cylindrical member by welding or brazing to the recessed area of the radially outer surface of the disk such that particles produced while welding or brazing the disk to the second end of the cylindrical member are received and contained within the recessed area.

Another feature of the invention is to provide in the step of welding the disk to the second end of the cylindrical member, the step of selecting a form of welding from the group of electron beam welding, laser beam welding or arc welding to weld the disk to the second end of the cylindrical member.

A feature of a further embodiment of the invention is to provide a method of manufacturing a piston which includes providing an elongated member having a first radially outwardly extending cylindrical projection with a first radially outer surface defined by a first outer diameter at a first end of the elongated member and a second radially outwardly extending cylindrical projection with a second radially outer surface defined by a second outer diameter substantially equal to the first outer diameter at a second end of the elongated member. The method also includes providing an annular cylindrical member having an inner annular surface defined by an inner diameter substantially equal to the first and second outer diameters of the first and second radially outer surfaces of the first and second projections of the elongated member. The method further includes forming a first circumferentially extending recessed area in the first radially outer surface of the first projection of the elongated member and forming a second circumferentially extending recessed area in the second radially outer surface of the second projection of the elongated member. The method continues by welding the annular cylindrical member to the first and second projections of the elongated member by welding to the first and second recessed areas of the first and second radially outer surfaces of the first and second projections of the elongated member such that particles produced while welding the annular cylindrical member to the first and second projections of the elongated member are received and contained with the first and second recessed areas.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
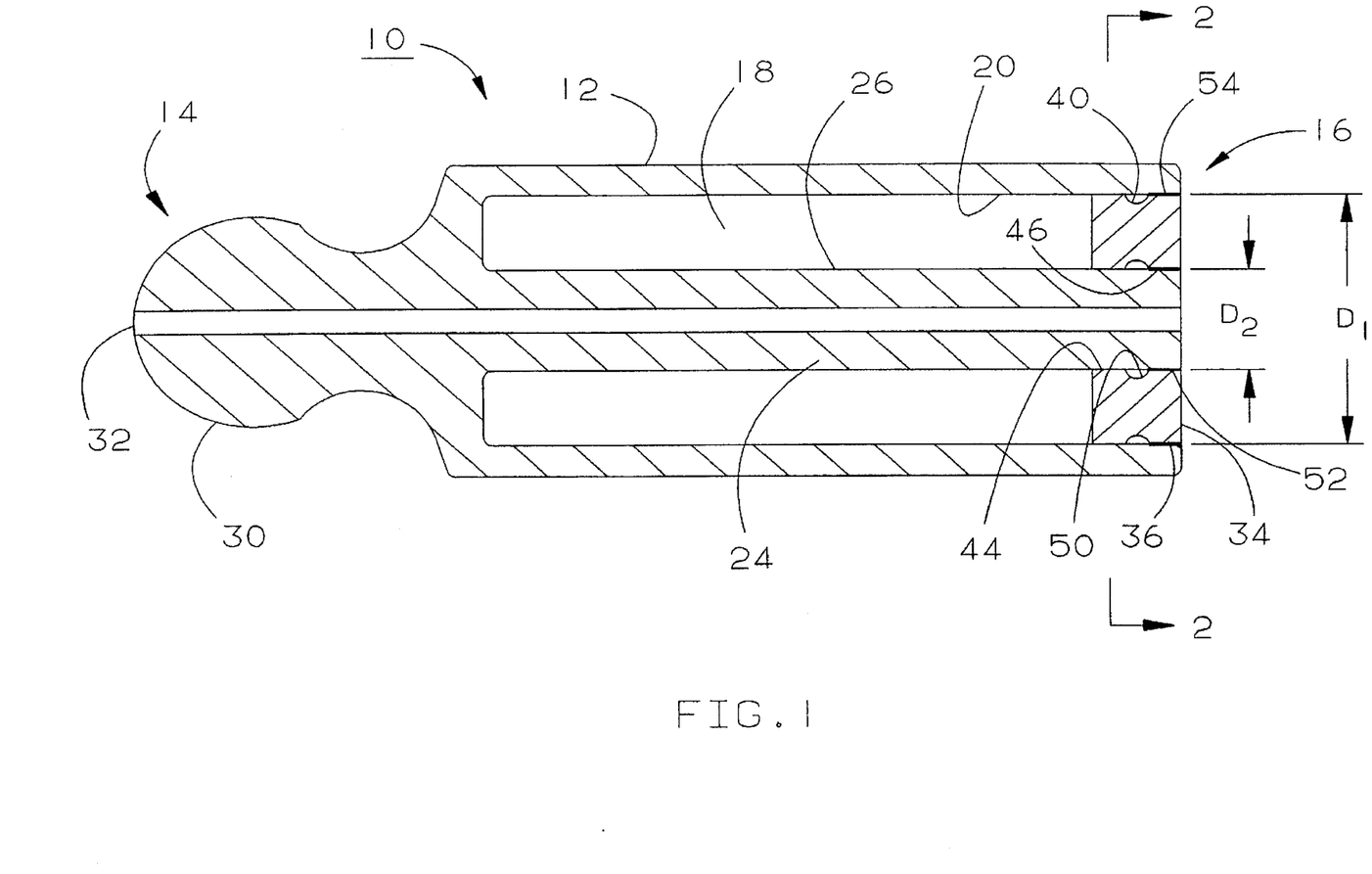
FIG. 1 is a cross-sectional view of a piston illustrating an embodiment of the instant invention.

Referring now to the drawings and specifically FIG. 1, a piston, generally designated 10, is illustrated in accordance with the instant invention. The piston 10 is formed of a substantially cylindrical member 12 having a first end, generally designated 14, and a second end, generally designated 16. The cylindrical member 12 has an open cavity 18 which extends axially from the second end 16 to adjacent the first end 14. From such a geometry, it may be appreciated that the second end 16 is annular in nature and has an inner annular surface 20 which is defined by an inner diameter, $D_1$. Further, the open cavity 18 extending from the second end 16 of the cylindrical member 12 may be annularly shaped such that the second end 16 includes an inner elongated portion 24. With this geometry, one skilled in the art can appreciate that the inner elongated portion 24 has a radially outer surface 26 which is defined by an outer diameter, $D_2$, which is concentrically located within the inner annular surface 20. The cavity 18 allows for a reduction in mass and subsequent weight of the piston 10 which results in increased performance. The first end 14 of the cylindrical member 12 may be defined as a generally spherical projection 30 which enables the first end 14 of the piston 10 to reciprocate in a translating and rotating motion within a fluidics unit (not shown), such as a hydraulic pump or motor. Furthermore, the inner elongated portion 24 of the second end 16 of the cylindrical member 12 may include a passage 32 which extends axially from the second end 16 through the spherical projection 30 of the first end 14 of the cylindrical member 12. The passage 32 allows lubricating fluid to flow between the spherical projection 30 and the fluidics unit (not shown).

The cylindrical member 12, in a preferred embodiment, may be constructed as an integral element through a manufacturing process such as that known in the art as trepanning or gun drilling. Alternatively, the cylindrical member 12 may be constructed by forging, extruding, cold forming, casting, electro-chemical machining (ECM) or electrical discharge machining (EDM) the cylindrical member 12. By utilizing such a construction, any joint likely to trigger failure from uncontrolled stress is eliminated from the spherical projection 30 of the first end 14 and relocated to the second end 16 of the cylindrical member 12. Furthermore, constructing the cylindrical member 12 as an integral element eases inspection, especially that of a non-destructive nature because only one end of hardware needs to be inspected. In a preferred embodiment, the cylindrical member 12 should be constructed from a wear resistant material, such as a bearing steel, case hardening steel or an anodized aluminum, or as the art advances, may be constructed from a ceramic or other non-metallic material.

Figure 2:
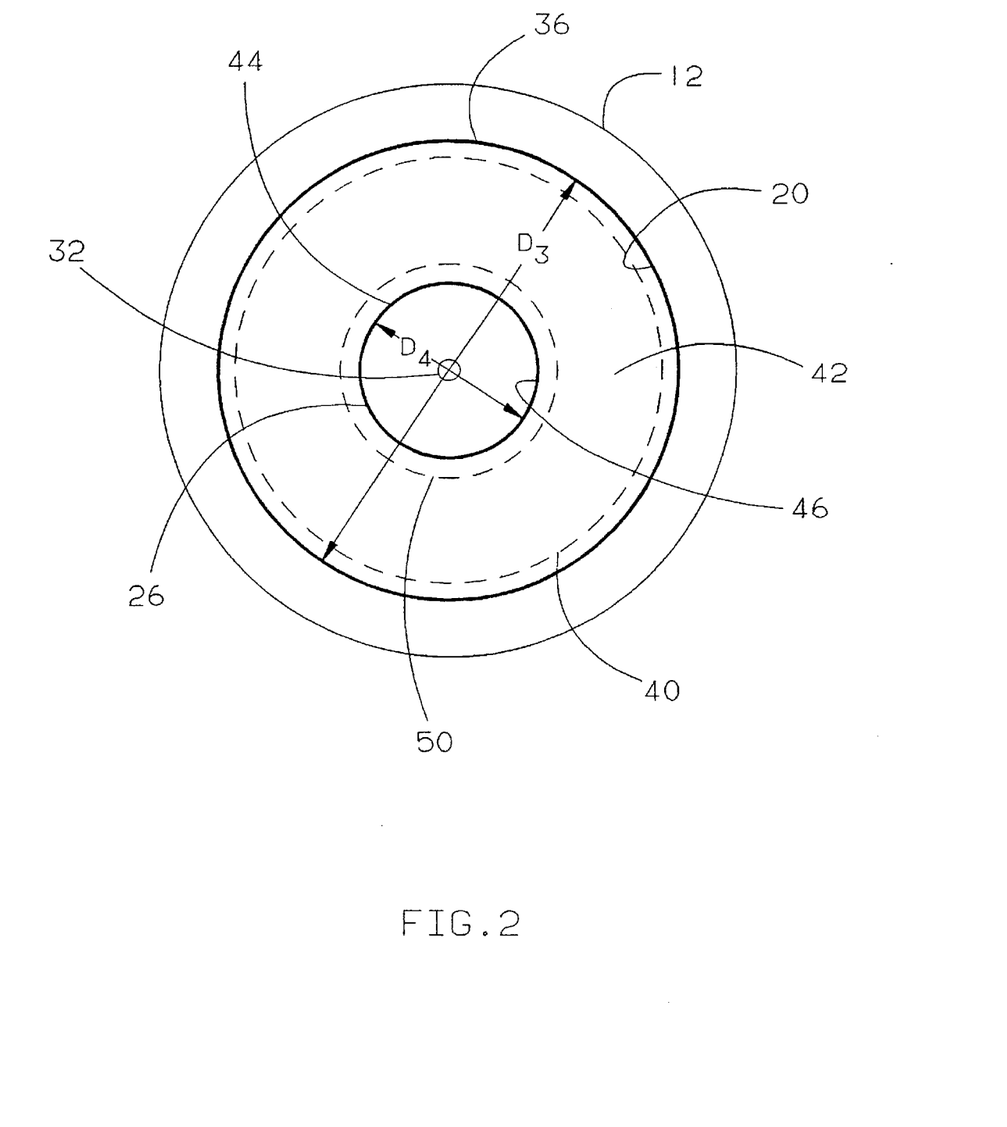
FIG. 2 is a cross-sectional view along the line 2—2 of FIG. 1.

The piston 10 also includes a disk 34 which has a radially outer surface 36 which is defined by an outer diameter, $D_3$ (FIG. 2). The disk 34 may be manufactured from any one several materials such as bearing steel, carburizing steel, stainless steel, carbon steel, nickel or nickel-based super alloy, or a ceramic or non-metallic material compatible with the cylindrical member 12. The outer diameter $D_3$ of the disk 34 is substantially equal to the inner diameter $D_1$ of the inner annular surface 20 of the second end 16 of the cylindrical member 12. As can be seen in FIG. 1, the radially outer surface 36 of the disk 34 includes a circumferentially extending recessed area 40. The recessed area 40 may be in the form of a groove or channel, as shown, or as can be appreciated, another form of corrugation.

In assembling the piston 10, the disk 34 is fixedly secured to the cylindrical member 12 by a manufacturing process such as welding or brazing. As can be appreciated from one skilled in the art, the recessed area 40 of the radially outer surface 36 of the disk 34 receives particles produced from the welding or brazing process used to fixedly secure the disk 34 to the second end 16 of the cylindrical member 12, and prevents such particles from entering the cavity 18 of the piston 10. Thus, the subsequent failure of the piston 10 within the fluidics unit because of excess weld particles translating and rotating within the piston 10 and wearing down the inner annular surface 20 of the cylindrical member 12 is minimized by providing the recessed area 40.

As can be viewed in FIG. 2, the disk 34 is preferably in the form of an annular ring 42 which has a central opening 44 therethrough. With such a geometry, it can be appreciated that the annular ring 42 has a radially inner surface 46 which is defined by an inner diameter, $D_4$, about the opening 44. The inner diameter $D_4$ of the annular ring 42 is substantially equal to the outer diameter $D_2$ of the inner elongated portion 24 of the second end 16 of the cylindrical member 12. The radially inner surface 46 of the annular ring 42 may also include a second circumferentially recessed area 50 (FIG. 1) for receiving weld particles produced in the process of fixedly securing the annular ring 42 to the second end 16 of the cylindrical member 12.

As can be appreciated from FIGS. 1 and 2, when the disk 34 is in the form of the annular ring 42, the piston 10 includes a first circumferential weld 52 fixedly securing the radially inner surface 46 of the annular ring 42 to the radially outer surface 26 of the inner elongated portion 24 of the second end 16 of the cylindrical member 12. The piston 10 also includes a second circumferential weld 54 which fixedly secures the radially outer surface 36 of the annular ring 42 to the inner annular surface 20 of the second end 16 of the cylindrical member 12. As can be appreciated in this embodiment, both the recessed area 40 and the second recessed area 50 receive particles produced from the second and first circumferential welds, respectively, as the annular ring 42 is fixedly secured to the second end 16 of the cylindrical member 12.

Figure 3:
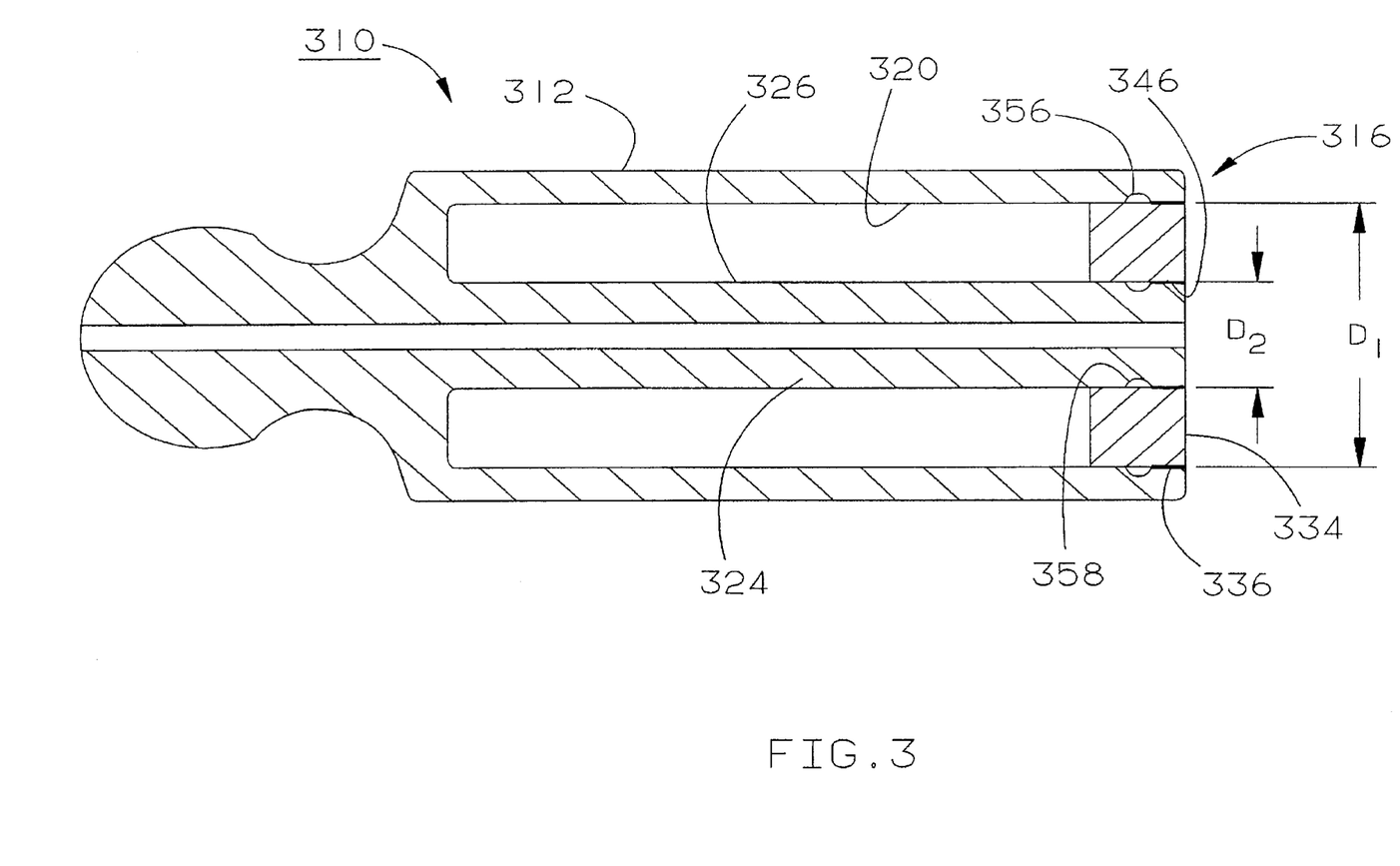
FIG. 3 is a cross-sectional view of a piston illustrating a further embodiment of the instant invention.

FIG. 3 depicts a further embodiment of a piston 310 in accordance with the instant invention. In this embodiment, an inner annular surface 320 of a second end 316 of a cylindrical member 312 includes a circumferentially extending recessed area 356. The recessed area 356 is adapted to receive weld particles produced while fixedly securing a radially outer surface 336 of a disk 334 to the inner annular surface 320 of the second end 316 of the cylindrical member 312 in a similar fashion to the recessed area 40 of the embodiment depicted in FIG. 1. A radially outer surface 326 of an inner elongated portion 324 of the second end 316 of the cylindrical member 312 may also include a second circumferentially extending recessed area 358 for receiving and containing particles produced while fixedly securing a radially inner surface 346 of the disk 334, when the disk 334 is in the form of an annular ring, to the radially outer surface 326 of the inner elongated portion 324 of the second end 316 of the cylindrical member 312 through such manufacturing processes as welding and brazing. One skilled in the art can appreciate the features of piston 10 for the embodiment shown in FIG. 1 are apparent with the alternative embodiment disclosed in FIG. 3.

Figure 6:
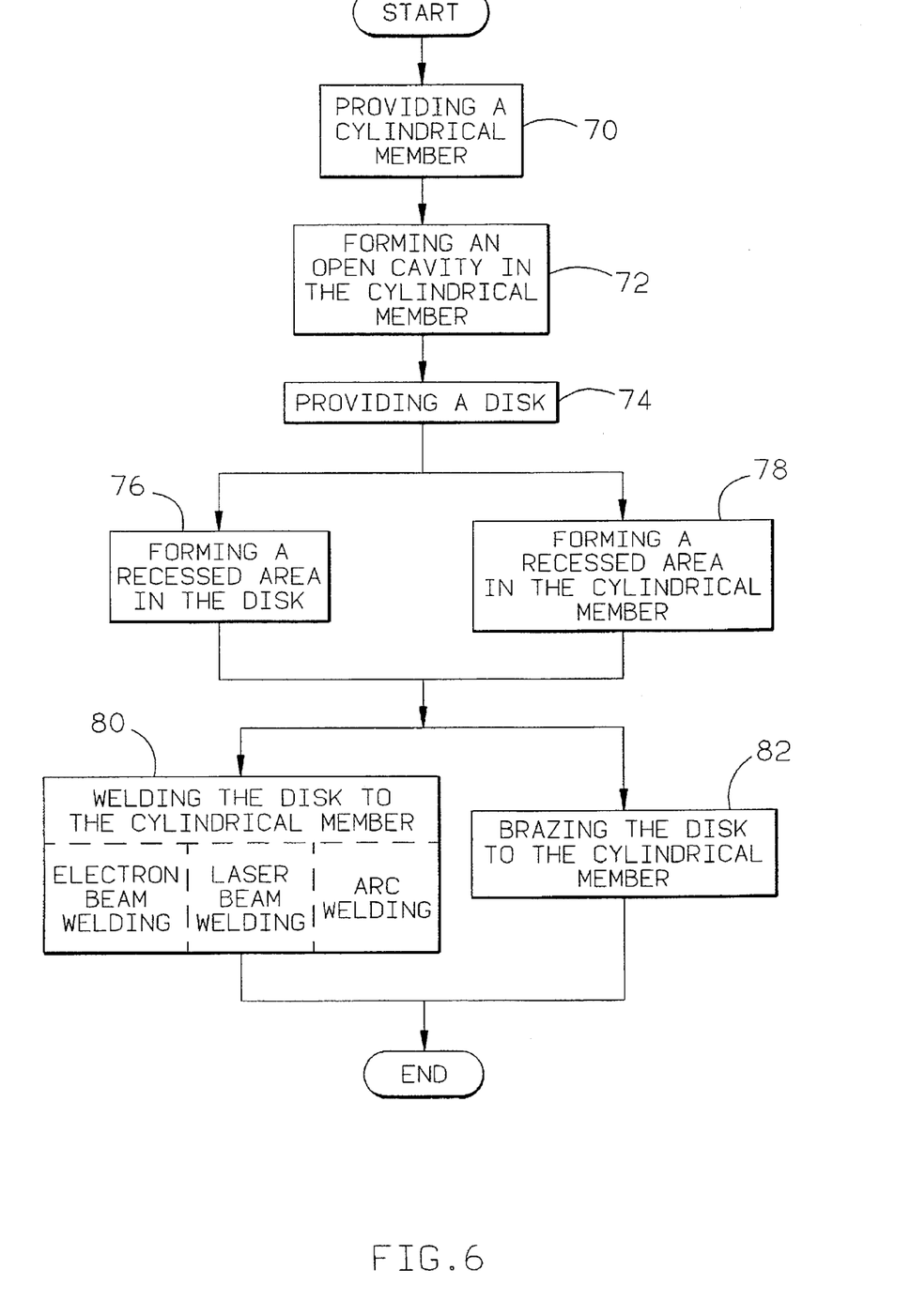
FIG. 6 is a process flow diagram of an embodiment of a method of manufacturing a piston in accordance with the instant invention.

Referring now to FIG. 6, a process flow diagram of a method of manufacturing a piston, as disclosed above, is illustrated in accordance with the instant invention.

A first step 70 of the process includes providing the substantially cylindrical member 12 having the first end 14 and the second end 16 (FIG. 1). A second step 72 of the process includes forming the open cavity 18 in the cylindrical member 12 which extends axially from the second end 16 to adjacent the first end 14 of the cylindrical member 12. One skilled in the art can appreciate by forming the cavity 18 with such a geometry, the second end 16 of the cylindrical member includes the inner annular surface 20 which is defined by the inner diameter, $D_1$ (FIG. 1).

The method continues by providing, in a third step 74, the disk 34 having the radially outer surface 36 defined by the outer diameter, $D_3$ (FIG. 1), which is substantially equal to the inner diameter $D_1$ of the inner annular surface 20 of the second end 16 of the cylindrical member 12.

The method continues by allowing alternative embodiments of the piston 10 to be manufactured either via a step 76 or an alternate step 78. The step 76 includes forming the circumferentially extending recessed area 40 in the radially outer surface 36 of the disk 34 (FIG. 1). The alternate step 78 includes forming the circumferentially extending recessed area 356 in the inner annular surface 320 of the second end 316 of the cylindrical member 312 (FIG. 3). Additionally, one skilled in the art can appreciate that if the disk 34 is provided in the form of the annular ring 42 (FIG. 2), the step 76 includes forming the second circumferentially extending recessed area 50 in the radially inner surface 46 of the annular ring 42. In the alternative embodiment disclosed (FIG. 3), the alternate step 78 includes forming the second circumferentially extending recessed area 358 in the radially outer surface 326 of the inner elongated portion 324 of the second end 316 of the cylindrical member 312.

As illustrated in FIG. 6, the process concludes in either a final step 80 or a final alternate step 82. In the final step 80, the disk 34 is welded to the second end 16 of the cylindrical member 12 by welding to either of the recessed areas 40 or 356, formed in the step 76 or the alternate step 78, respectively, depending on which embodiment is employed. By limiting penetration of welding to either of the recessed areas 40 and 356, formed either in the steps 76 and 78, respectively, any particles produced while welding the disk 34 to the second end 16 of the cylindrical member 12 are received and contained within either of the recessed areas 40 and 356, and subsequently prevented from entering the cavity 18. Additionally, if the disk 34 is provided in the form of the annular ring 42 (FIG. 2), the annular ring 42 is also welded to the second end 16 of the cylindrical member 12 by welding to the second recessed area 50 in the radially inner surface 46 of the annular ring 42 for the embodiment disclosed in FIG. 1, and to the second recessed area 358 in the radially outer surface 326 of the inner elongated portion 324 of the second end 316 of the cylindrical member 312 for the embodiment disclosed in FIG. 3.

In the final step 80, several welding alternatives may be utilized to weld the disk 34 to the second end 16 of the cylindrical member 12. These include electron beam welding, laser beam welding and arc welding, as for example, in the form of tungsten inert gas welding or plasma arc welding.

In a further embodiment of the method disclosed in FIG. 6, the final alternate step 82 includes brazing the disk 34 to the second end 16 of the cylindrical member 12 by brazing to either of the recessed areas 40 or 356, formed in the step 76 or the alternate step 78, respectively, depending on which embodiment of the piston 10 or the piston 310 is employed. One skilled in the art of manufacturing pistons can appreciate that brazing may include low temperature soldering. Each of these manufacturing alternatives bear advantages depending on the material selected from which to construct the disk 34 and the cylindrical member 12.

Figure 4:
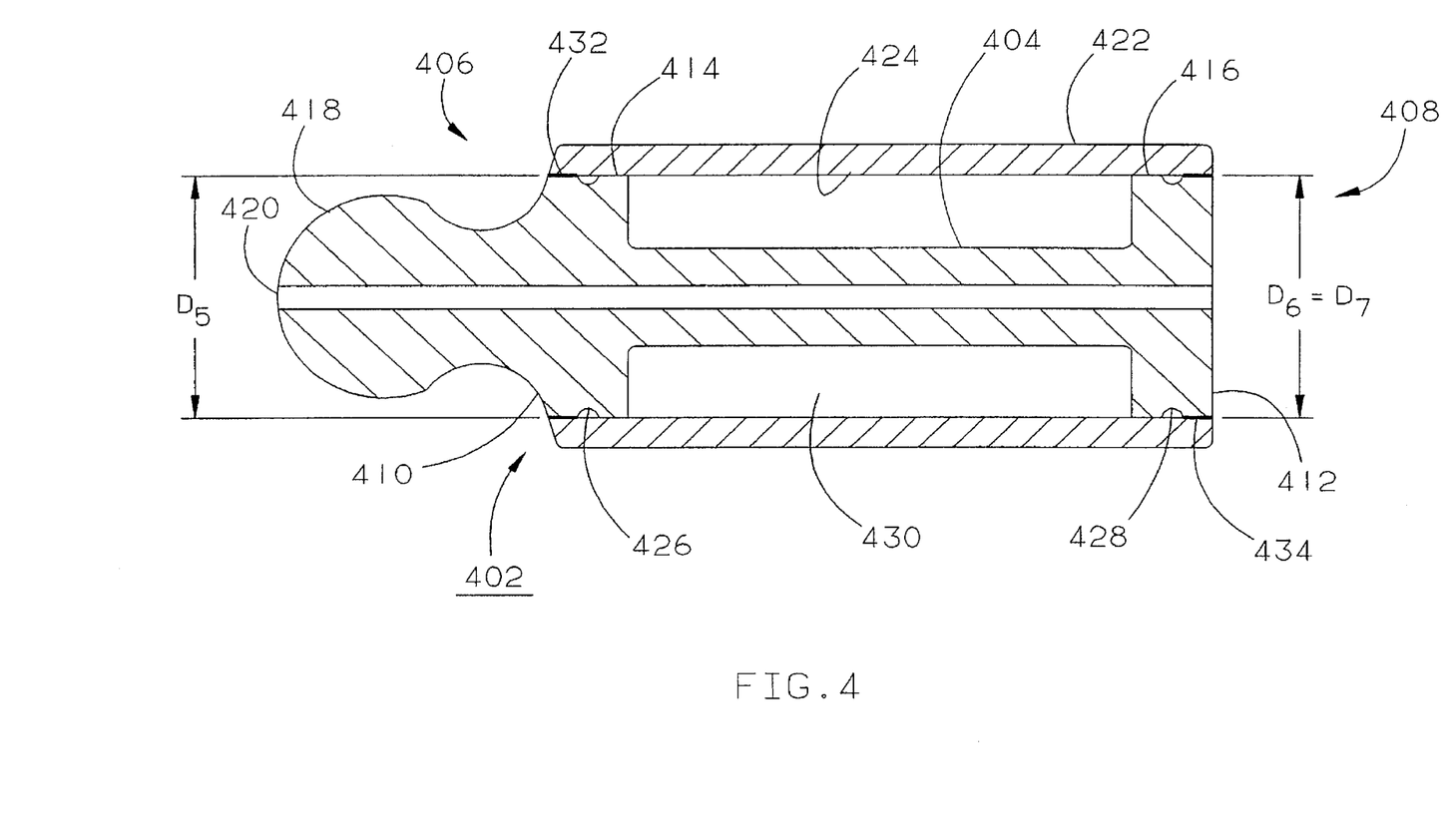
FIG. 4 is a cross-sectional view of a piston illustrating a further embodiment of the instant invention.

Referring now to FIG. 4, an alternate preferred embodiment of a piston 402 is disclosed in accordance with the instant invention. The piston 402 is formed of an elongated member 404 having a first end, generally designated 406, and a second end, generally designated 408. The elongated member 404 includes a first radially outwardly extending cylindrical projection 410 at the first end 406 of the elongated member 404, and a second radially outwardly extending cylindrical projection 412 at the second end 408 of the elongated member 404. With such a geometry, one skilled in the art can appreciate that the first projection 410 has a first radially outer surface 414 which is defined by a first outer diameter, $D_5$. The second projection 412 has a second radially outer surface 416 which is defined by a second outer diameter, $D_6$. In a preferred embodiment, one can appreciate the first outer diameter $D_5$ of the first radially outer surface 414 of the first projection 410 is substantially equal to the second outer diameter $D_6$ of the second radially outer surface 416 of the second projection 412. The first end 406 of the elongated member 404 may be defined as a generally spherical projection 418 which enables the first end 406 of the piston 402 to reciprocate in a translating and rotating motion within a fluidics unit (not shown), such as a hydraulic pump or motor. Furthermore, the elongated member 404 may include a passage which extends axially from the second end 408 through the spherical projection 418 of the first end 406 of the elongated member 404. The passage 420 allows lubricating fluid to flow between the spherical projection 418 and the fluidics unit (not shown).

The elongated member 404, in a preferred embodiment, may be constructed as an integral element through a manufacturing process such as that known in the art as lathe turning. Alternatively, the elongated member 404 may be constructed by utilizing the manufacturing processes of gun drilling, forging, extruding, cold forming, casting, electrochemical machining (ECM) or electrical discharge machining (EDM). In a preferred embodiment, the elongated member 404 should be constructed from a wear resistant material, such as a bearing steel, case hardening steel or an anodized aluminum, or as the art advances, may be constructed from a ceramic or other non-metallic material.

As can be seen in FIG. 4, the first radially outer surface 414 of the first projection 410 includes a first circumferentially extending recessed area 426 and the second radially outer surface 416 of the second projection 412 includes a second circumferentially extending recessed area 428. The first and second recessed areas, 426 and 428, may be in the form of a groove or channel, as shown, or as can be appreciated, another form of corrugation.

The piston 402 also includes an annular cylindrical member 422 which has an inner annular surface 424 which is defined by an inner diameter, $D_7$. The annular cylindrical member 422 may be manufactured from any one several materials such as bearing steel, carburizing steel, stainless steel, carbon steel, nickel or nickel-based super alloy, or a ceramic or non-metallic material compatible with the elongated member 404. One can appreciate that the inner diameter $D_7$ of the inner annular surface 424 of the annular cylindrical member 422 is substantially equal to the first outer diameter $D_5$ and the second outer diameter $D_6$ of the first and second radially outer surfaces, 414 and 416, respectively, of the elongated member 404.

In assembling the piston 402, the annular cylindrical member 422 is fixedly secured to the first projection 410 and the second projection 412 of the elongated member 404. With this geometry, a hollow cavity 430 is formed between the annular cylindrical member 422 and the elongated member 404. The cavity 430 allows for a reduction in mass and subsequent weight of the piston 402 which results in increased performance. As can be appreciated from one skilled in the art, the first and second recessed areas, 426 and 428, of the first and second radially outer surfaces, 414 and 416, of the first and second projections, 410 and 412, respectively, of the elongated member 404 receive particles produced from a welding process used to fixedly secure the annular cylindrical member 422 to the elongated member 404, and prevent such particles from entering the cavity 430 of the piston 402. A brazing process may also be employed to fixedly secure the annular cylindrical member 422 to the first and second projections, 410 and 412 of the elongated member 404 wherein excess brazing material is received and contained within the first and second recessed areas, 426 and 428 of the first and second projections, 410 and 412 of the elongated member 404. Thus, the subsequent failure of the piston 402 within a fluidics unit because of either undesirable weld particles or excess brazing material translating and rotating within the cavity 430 of the piston 402 and wearing down the inner annular surface 424 of the annular cylindrical member 422 is minimized by providing the first and second recessed areas, 426 and 428.

As can be appreciated from FIG. 4, when the manufacturing process of welding is utilized to fixedly secure the first and second projections 410 of the elongated member 404 to the annular cylindrical member 422, the piston 402 includes a first circumferential weld 432 fixedly securing the first radially outer surface 414 of the first projection 410 of the elongated member 404 to the inner annular surface 424 of the annular cylindrical member 422. The piston 402 also includes a second circumferential weld 434 which fixedly secures the second radially outer surface 416 of the second projection 412 of the elongated member 404 to the inner annular surface 424 of the annular cylindrical member 422.

Figure 5:
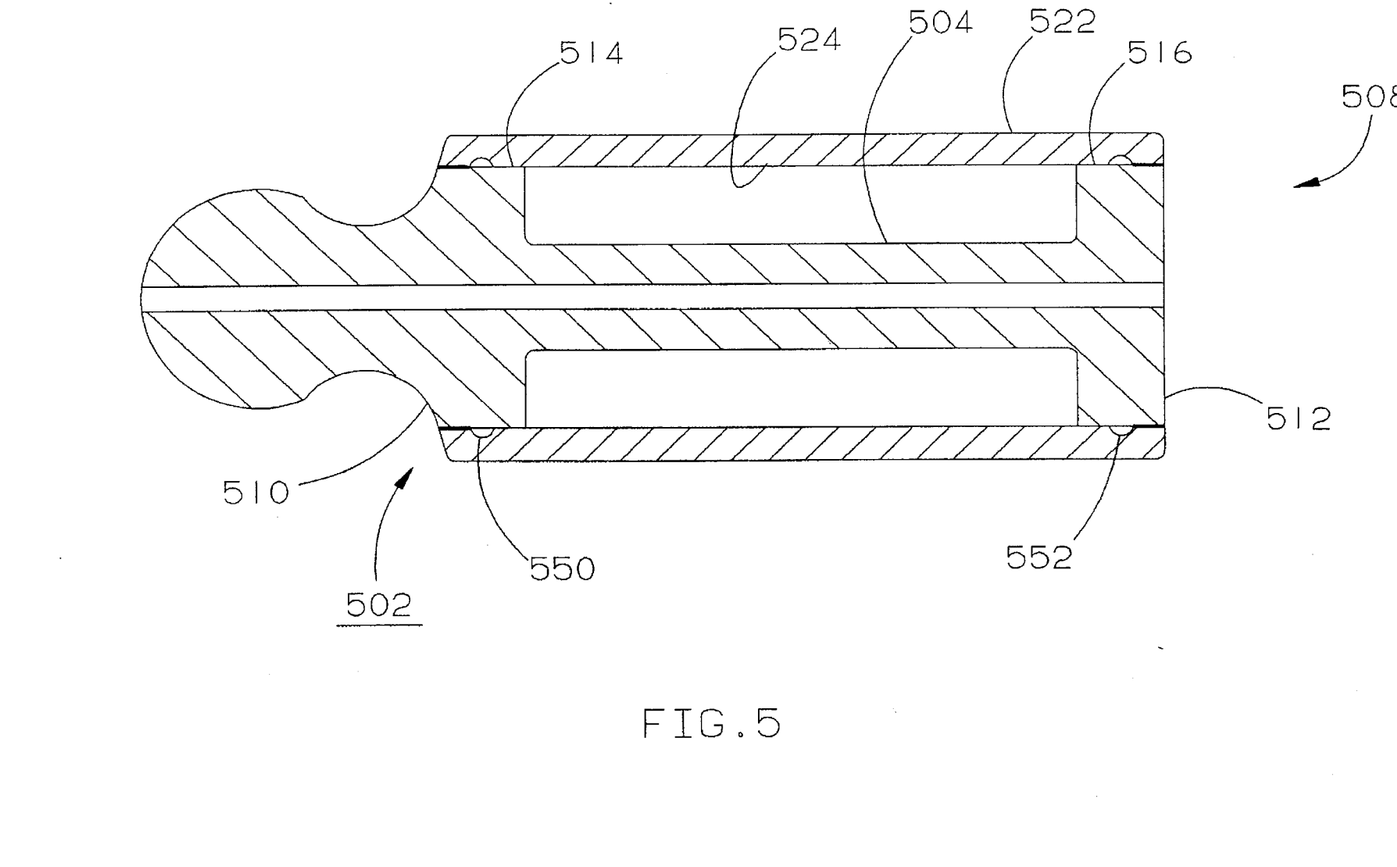
FIG. 5 is a cross-sectional view of a piston illustrating a further embodiment of the instant invention.

FIG. 5 depicts a further embodiment of a piston 502 in accordance with the instant invention. In this embodiment, an inner annular surface 524 of an annular cylindrical member 522 includes a first circumferentially extending recessed area 550 opposite a first radially outwardly extending cylindrical projection 510 of an elongated member 504. The inner annular surface 524 of the annular cylindrical member 522 also includes a second circumferentially extending recessed area 552 opposite a second radially outwardly extending cylindrical projection 512 of the elongated member 504. The first and second recessed areas, 550 and 552 are adapted to receive weld particles produced while fixedly securing the inner annular surface 524 of the annular cylindrical member 522 to a first radially outer surface 514 of the first projection 510, and a second radially outer surface 516 of the second projection 512 of the elongated member 504 in a similar fashion to the first and second recessed areas, 426 and 428 of the embodiment depicted in FIG. 4. One skilled in the art can appreciate the features of piston 402 for the embodiment shown in FIG. 4 are apparent with the alternative embodiment disclosed in FIG. 5.

Figure 7:
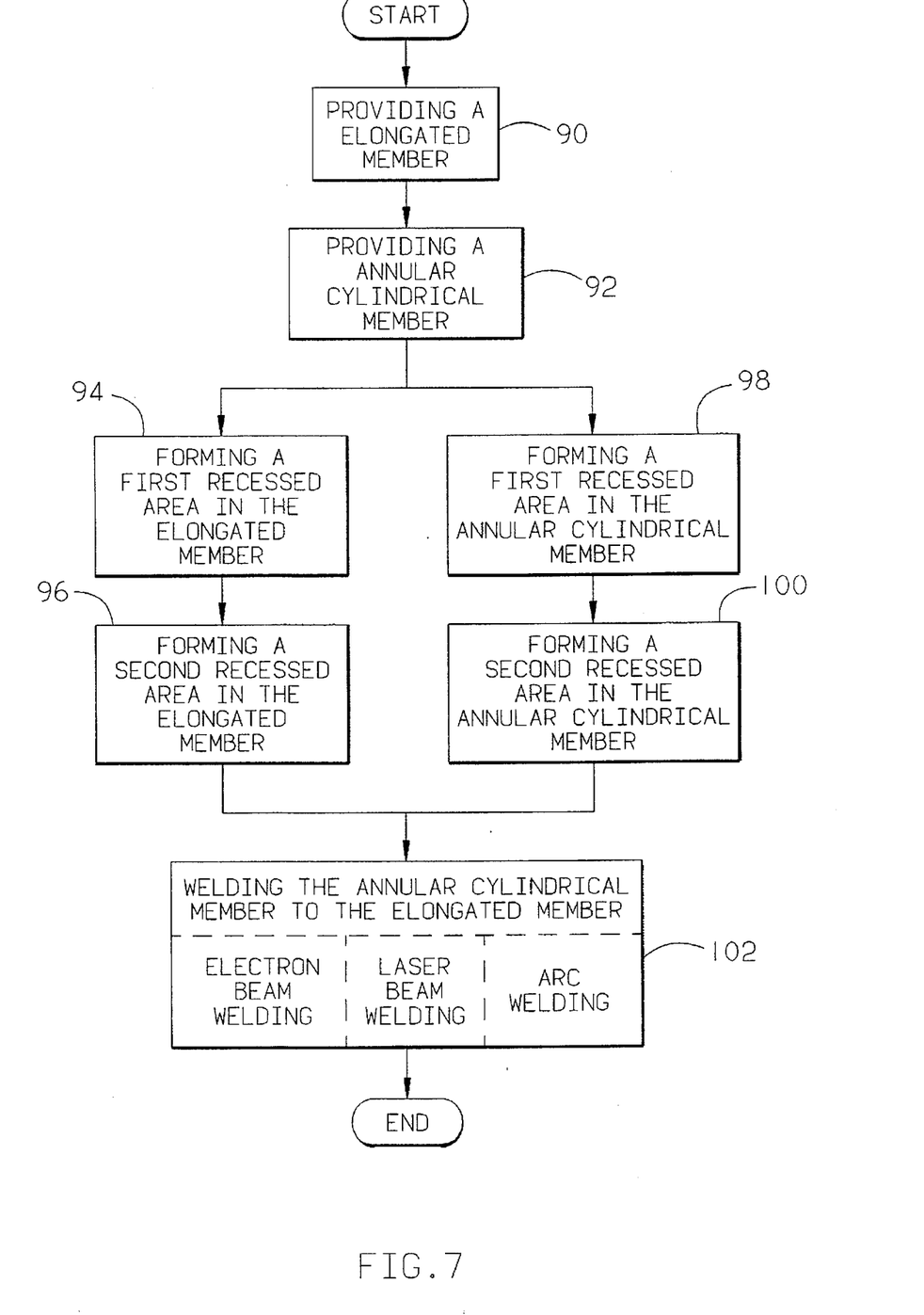
FIG. 7 is a process flow diagram of a further embodiment of a method of manufacturing a piston in accordance with the instant invention.

Referring now to FIG. 7, a process flow diagram of a method of manufacturing a piston, as disclosed above, is illustrated in accordance with the instant invention.

A first step 90 of the process includes providing the elongated member 404 having the first radially outwardly extending projection 410 with the first radially outer surface 414 defined by the first outer diameter $D_5$ at the first end 406 of the elongated member 404, and also providing the second radially outwardly extending projection 412 with the second radially outer surface 416 defined by the second diameter $D_6$ substantially equal to the first outer diameter $D_5$ at the second end 408 of the elongated member 404 (FIG. 4).

The method continues by providing, in a second step 92, the annular cylindrical member 422 having the inner annular surface 424 defined by an inner diameter $D_7$ (FIG. 4), which is substantially equal to the first and second outer diameters, $D_5$ and $D_6$ of the first and second radially outer surfaces, 414 and 416 of the first and second projections, 410 and 412 of the elongated member 404.

The method continues by allowing alternative embodiments of the piston 402 to be manufactured either via a first forming step 94 and a second forming step 96, or a first alternate step 98 and a second alternate step 100. The first forming step 94 includes forming the first circumferentially extending recessed area 426 in the first radially outer surface 414 of the first projection 410 of the elongated member 404 (FIG. 4). The second forming step 96 includes forming the second circumferentially extending recessed area 428 in the second radially outer surface 416 of the second projection 412 of the elongated member 404. The first alternate step 98 includes forming the first circumferentially extending recessed area 550 in the first radially outer surface 514 of the first projection 510 of the elongated member 504 (FIG. 5). The second alternate step 100 includes forming the second circumferentially extending recessed area 552 in the second radially outer surface 516 of the second projection 512 of the elongated member 504 (FIG. 5). One skilled in the art can appreciate the second forming step 96 is utilized in the embodiment employing the first forming step 94 (FIG. 4), and the second alternate step 100 is utilized in the alternate embodiment employing the first alternate step 98 (FIG. 5).

As illustrated in FIG. 7, the process concludes in a final step 102. In the final step 102, the annular cylindrical member 422 is welded to the first projection 410 and the second projection 412 of the elongated member 404 by welding to the first and second recessed areas, 426 and 428, of the first and second radially outer surfaces, 414 and 416 of the first and second projections, 410 and 412, respectively, of the elongated member, formed in the first and second forming steps, 94 and 96, or by welding to the first and second recessed areas, 550 and 552, of the inner annular surface 524 of the annular cylindrical member 522, formed in the first and second alternate steps, 98 and 100, depending on whether the embodiment of FIG. 4 or FIG. 5 is being manufactured. By limiting penetration of welding to either of the first and second recessed areas, 426 and 428, or the first and second recessed areas, 550 and 552, any particles produced while welding the annular cylindrical member 422 to the first and second projections, 410 and 412 of the elongated member 404 are received and contained within either of the first and second recessed areas, 426 and 428, or 550 and 552, and subsequently prevented from entering the cavity 430.

In the final step 102, several welding alternatives may be utilized to weld the annular cylindrical member 422 to the first and second projections, 410 and 412 of the elongated member 404. These include electron beam welding, laser beam welding and arc welding, as for example, in the form of tungsten inert gas welding or plasma arc welding. One skilled in the art can appreciate that a brazing process could also be utilized to fixedly secure the annular cylindrical member 422 to the first and second projections, 410 and 412 of the elongated member 404.

Numerous modifications in the alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A piston, comprising:
   a substantially cylindrical member having a first end and a second end, the cylindrical member having an open cavity extending axially from the second end to adjacent the first end such that the second end has an inner annular surface defined by an inner diameter; and
   a disk having a radially outer surface defined by an outer diameter fixedly secured to the second end of the cylindrical member, the outer diameter of the disk being substantially equal to the inner diameter of the inner annular surface of the second end of the cylindrical member, the radially outer surface of the disk having a circumferentially extending recessed area for receiving particles produced while fixedly securing the disk to the second end of the cylindrical member.

2. The piston of claim 1 wherein the cavity extending from the second end of the cylindrical member is annularly shaped such that the second end has an inner elongated portion having a radially outer surface defined by an outer diameter which is concentrically located within the inner annular surface.

3. The piston of claim 2 wherein the disk is in the form of an annular ring having a central opening therethrough, the annular ring having a radially inner surface defined by an inner diameter about the opening which is substantially equal to the outer diameter of the inner elongated portion of the second end of the cylindrical member.

4. The piston of claim 3 wherein the radially inner surface of the annular ring includes a second circumferentially extending recessed area for receiving particles produced while fixedly securing the annular ring to the second end of the cylindrical member.

5. The piston of claim 4 further including a first circumferential weld fixedly securing the radially inner surface of the annular ring to the radially outer surface of the inner elongated portion of the second end of the cylindrical member and a second circumferential weld fixedly securing the radially outer surface of the annular ring to the inner annular surface of the second end of the cylindrical member.

6. The piston of claim 5 wherein the cylindrical member is an integral element.

7. The piston of claim 6 wherein the inner elongated portion of the second end includes a passage extending axially from the second end through the first end of the cylindrical member.

8. The piston of claim 1 further including a weld fixedly securing the radially outer surface of the disk to the inner annular surface of the second end of the cylindrical member.

9. The piston of claim 1 wherein the cylindrical member is an integral element.

10. A piston, comprising:
    a substantially cylindrical member having a first end and a second end, the cylindrical member having an open cavity extending axially from the second end to adjacent the first end such that the second end has an inner annular surface defined by an inner diameter, the inner annular surface having a circumferentially extending recessed area; and
    a disk having a radially outer surface defined by an outer diameter fixedly secured to the second end of the cylindrical member, the outer diameter of the disk being substantially equal to the inner diameter of the inner annular surface of the second end of the cylindrical member, the recessed area of the inner annular surface of the second end of the cylindrical member being adapted to receive particles produced while fixedly securing the disk to the second end of the cylindrical member.

11. The piston of claim 10 wherein the cavity extending from the second end of the cylindrical member is annularly shaped such that the second end has an inner elongated portion having a radially outer surface defined by an outer diameter which is concentrically located within the inner annular surface.

12. The piston of claim 11 wherein the disk is in the form of an annular ring having a central opening therethrough, the annular ring having a radially inner surface defined by an inner diameter about the opening which is substantially equal to the outer diameter of the inner elongated portion of the second end of the cylindrical member.

13. The piston of claim 12 wherein the radially outer surface of the inner elongated portion of the second end of the cylindrical member includes a second circumferentially extending recessed area for receiving particles produced while fixedly securing the annular ring to the second end of the cylindrical member.

14. The piston of claim 13 further including a first circumferential weld fixedly securing the radially inner surface of the annular ring to the radially outer surface of the inner elongated portion of the second end of the cylindrical member and a second circumferential weld fixedly securing the radially outer surface of the annular ring to the inner annular surface of the second end of the cylindrical member.

15. The piston of claim 14 wherein the cylindrical member is an integral element.

16. The piston of claim 15 wherein the inner elongated portion of the second end includes a passage extending axially from the second end through the first end of the cylindrical member.

17. The piston of claim 10 further including a weld fixedly securing the radially outer surface of the disk to the inner annular surface of the second end of the cylindrical member.

18. The piston of claim 10 wherein the cylindrical member is an integral element.

19. A piston, comprising:

an elongated member having a first end and a second end, the elongated member having a first radially outwardly extending cylindrical projection at the first end of the elongated member and a second radially outwardly extending cylindrical projection at the second end of the elongated member, the first projection having a first radially outer surface defined by a first outer diameter, the second projection having a second radially outer surface defined by a second outer diameter, the first outer diameter of the first radially outer surface of the first projection being substantially equal to the second outer diameter of the second radially outer surface of the second projection, the first radially outer surface of the first projection having a first circumferentially extending recessed area, the second radially outer surface of the second projection having a second circumferentially extending recessed area; and an annular cylindrical member having an inner annular surface defined by an inner diameter fixedly secured to the first and second projections of the elongated member, the inner diameter of the inner annular surface of the annular cylindrical member being substantially equal to the first and second outer diameters of the first and second radially outer surfaces of the first and second projections of the elongated member, the first and second recessed areas of the first and second radially outer surfaces of the first and second projections of the elongated member each being adapted to receive particles produced while fixedly securing the annular cylindrical member to the first and second projections of the elongated member.

20. The piston of claim 19 further including a first circumferential weld fixedly securing the first radially outer surface of the first projection of the elongated member to the inner annular surface of the annular cylindrical member and a second circumferential weld fixedly securing the second radially outer surface of the second projection of the elongated member to the inner annular surface of the annular cylindrical member.

21. The piston of claim 20 wherein the elongated member is an integral element.

22. The piston of claim 21 wherein the elongated member includes a passage extending axially from the second end through the first end of the elongated member.

23. A piston, comprising:

an elongated member having a first end and a second end, the elongated member having a first radially outwardly extending cylindrical projection at the first end of the elongated member and a second radially outwardly extending cylindrical projection at the second end of the elongated member, the first projection having a first radially outer surface defined by a first outer diameter, the second projection having a second radially outer surface defined by a second outer diameter, the first outer diameter of the first radially outer surface of the first projection being substantially equal to the second outer diameter of the second radially outer surface of the second projection; and an annular cylindrical member having an inner annular surface defined by an inner diameter fixedly secured to the first and second projections of the elongated member, the inner diameter of the inner annular surface of the annular cylindrical member being substantially equal to the first and second outer diameters of the first and second radially outer surfaces of the first and second projections of the elongated member, the inner annular surface of the annular cylindrical member having a first circumferentially extending recessed area opposite the first projection of the elongated member and a second circumferentially extending recessed area opposite the second projection of the elongated member for receiving particles produced while fixedly securing the annular cylindrical member to the first and second projections of the elongated member.

24. The piston of claim 23 further including a first circumferential weld fixedly securing the first radially outer surface of the first projection of the elongated member to the inner annular surface of the annular cylindrical member and a second circumferential weld fixedly securing the second radially outer surface of the second projection of the elongated member to the inner annular surface of the annular cylindrical member.

25. The piston of claim 24 wherein the elongated member is an integral element.

26. The piston of claim 25 wherein the elongated member includes a passage extending axially from the second end through the first end of the elongated member.

* * * * *